United States Patent
Gervais

(10) Patent No.: US 11,360,694 B2
(45) Date of Patent: *Jun. 14, 2022

(54) METHOD PROVIDING RESILIENT EXECUTION OF A SERVICE ON A COMPUTING DEVICE

(71) Applicant: Distech Controls Inc., Brossard (CA)

(72) Inventor: Francois Gervais, Lachine (CA)

(73) Assignee: DISTECH CONTROLS INC., Brossard (CA)

(*) Notice: Subject to any disclaimer, the term of this patent is extended or adjusted under 35 U.S.C. 154(b) by 180 days.

This patent is subject to a terminal disclaimer.

(21) Appl. No.: 16/406,566

(22) Filed: May 8, 2019

(65) Prior Publication Data

US 2020/0356302 A1    Nov. 12, 2020

(51) Int. Cl.
*G06F 3/06* (2006.01)

(52) U.S. Cl.
CPC .......... *G06F 3/0655* (2013.01); *G06F 3/0622* (2013.01); *G06F 3/0679* (2013.01)

(58) Field of Classification Search
CPC . G06F 9/4868; G06F 11/1438; G06F 2201/84
See application file for complete search history.

(56) References Cited

U.S. PATENT DOCUMENTS

| | | | |
|---|---|---|---|
| 7,334,095 B1* | 2/2008 | Fair | G06F 3/0607 711/161 |
| 7,587,563 B1* | 9/2009 | Teterin | G06F 11/1435 711/162 |
| 7,694,328 B2 | 4/2010 | Joshi et al. | |
| 7,877,357 B1* | 1/2011 | Wu | G06F 11/1469 707/639 |
| 9,389,665 B1 | 7/2016 | Hagen | |

(Continued)

FOREIGN PATENT DOCUMENTS

EP    2360591 A1    8/2011

OTHER PUBLICATIONS

Non Final Office Action for U.S. Appl. No. 16/406,556, dated Nov. 17, 2020, 26 pages.

(Continued)

*Primary Examiner* — Gary W. Cygiel
(74) *Attorney, Agent, or Firm* — RatnerPrestia

(57) ABSTRACT

Method providing resilient execution of a service on a computing device. The service is stored in a non-volatile memory of the computing device and comprises instructions executable by a processor of the computing device. The processor generates an operational instance of the service, which comprises a reference to the service. The processor stores the operational instance of the service in the non-volatile memory with a read-write access right. The processor launches an executable instance of the service associated to the operational instance of the service. The launching comprises copying the instructions of the service from the non-volatile memory to a volatile memory of the computing device. The launching further comprises executing the instructions of the service copied into the volatile memory. The processor adds data generated by the execution of the instructions of the service to the operational instance of the service for permanent storage in the non-volatile memory.

21 Claims, 13 Drawing Sheets

(56) References Cited

U.S. PATENT DOCUMENTS

| | | |
|---|---|---|
| 10,037,334 B1 | 7/2018 | Lunev et al. |
| 2004/0230963 A1 | 11/2004 | Rothman et al. |
| 2005/0076264 A1* | 4/2005 | Rowan ............ G06F 11/1469 |
| | | 714/6.12 |
| 2006/0080424 A1 | 4/2006 | Sun et al. |
| 2006/0130046 A1 | 6/2006 | D'Neill |
| 2008/0155544 A1 | 6/2008 | Soussiel et al. |
| 2008/0243867 A1 | 10/2008 | Janedittakarn et al. |
| 2010/0017036 A1 | 1/2010 | Sexton et al. |
| 2011/0314534 A1 | 12/2011 | James |
| 2012/0266022 A1 | 10/2012 | Kydles et al. |
| 2014/0181579 A1 | 6/2014 | Whitehead et al. |
| 2015/0018980 A1 | 1/2015 | Heutger et al. |
| 2015/0143063 A1 | 5/2015 | Mutalik et al. |
| 2015/0261832 A1 | 9/2015 | Sinha et al. |
| 2016/0077930 A1 | 3/2016 | McKelvie et al. |
| 2017/0235950 A1 | 8/2017 | Gopalapura Venkatesh et al. |
| 2017/0286273 A1 | 10/2017 | Lau et al. |
| 2018/0173454 A1 | 6/2018 | Dornemann et al. |
| 2018/0300120 A1 | 10/2018 | Franchi et al. |
| 2019/0073227 A1 | 3/2019 | Zhong |
| 2020/0177072 A1 | 6/2020 | Bakovic et al. |

OTHER PUBLICATIONS

Final Office Action for U.S. Appl. No. 16/406,556, dated Apr. 30, 2021, 20 pages.
Non Final Office Action for U.S. Appl. No. 16/406,556, dated Oct. 5, 2021, 30 pages.
Notice of Allowance for U.S. Appl. No. 16/406,556, dated Mar. 14, 2022, 15 pages.
Yu, H., et al., "BIRDS: A Bare-Metal Recovery System for Instant Restoration of Data Services," Jun. 2014, vol. 63 (6), pp. 1392-1407, IEEE Transactions on Computers.

* cited by examiner

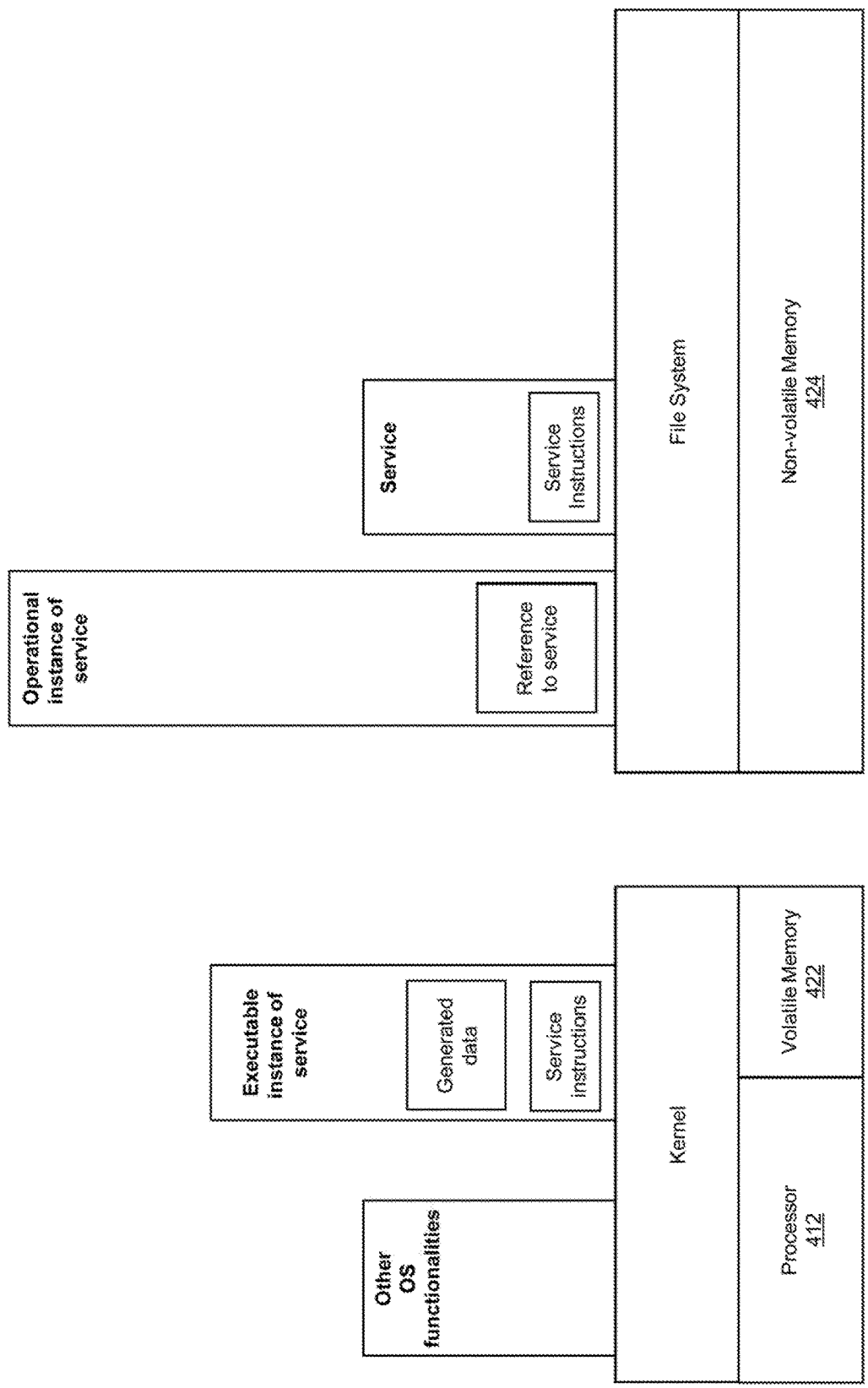

METHOD PROVIDING RESILIENT EXECUTION OF A SERVICE ON A COMPUTING DEVICE

TECHNICAL FIELD

The present disclosure relates to the field of resilience to software failures. More specifically, the present disclosure presents a method providing resilient execution of a service on a computing device.

BACKGROUND

Designing a software which behaves exactly as expected when executed by a processor of a computing device is almost impossible. The risk of introducing bugs in the code of the software increases with the size and complexity of the software (many other factors may also lead to the introduction of such bugs).

A failure during the execution of a software may occur because of a bug in the code of the software, or because of factors external to the software (e.g. a failure in the operating system of the computing device or a failure during the execution of another software affecting the execution of the software in question).

The failure affects the data generated by the execution of the software, which are generally lost. If the software comprises configuration data which can be modified during the execution of the software, the failure also affects the configuration data modified during the execution of the software, the modifications to the configuration data being generally lost.

The instructions of the software are generally stored in a non-volatile memory and a copy of the instructions to a volatile memory is made each time the software is executed by the processor of the computing device. Executing the software comprises (and generally consists in) executing the instructions of the software by the processor. In some cases, the failure occurring during the execution of the software also affects the instructions stored in the non-volatile memory (e.g. corruption or deletion of the instructions of the software). The instructions of the software stored in the non-volatile memory may also be corrupted or deleted due to a failure of the operating system or a failure of another software.

A software executed by a processor of a computing device is also referred to as a service or an application. The execution of the service or application by the processor of the computing device implements functionalities. The type of functionalities provided by the execution of a service or an application are almost infinite (e.g. data processing functionalities, networking functionalities, user interaction functionalities, device and process control functionalities, etc.).

The consequences of a failure of the execution of a service or an application may be subsequent in terms of safety for human beings, economic losses, etc. The consequences depend on the functionalities provided by the execution of the service or application. One way to prevent or at least limit the consequences is to provide an execution environment that includes a degree of resiliency to the occurrence of failures in the execution of a service or an application.

An operating system provides a certain level of resiliency to failures of services or applications executed under the control of the operating system. Some operating systems have been specifically designed to operate in critical environments (e.g. aeronautics, medical systems, etc.), providing a high level of resiliency by design. However, resiliency can be further improved by adding resilient mechanisms to an existing operating system or adding resilient mechanisms not directly integrated to the operating system.

Therefore, there is a need for a new method providing resilient execution of a service on a computing device.

SUMMARY

According to a first aspect, the present disclosure relates to a method providing resilient execution of a service on a computing device. The method comprises storing the service in a non-volatile memory of the computing device, the service comprising instructions executable by a processor of the computing device. The method comprises generating, by the processor, an operational instance of the service, the operational instance of the service comprising a reference to the service. The method comprises storing, by the processor, the operational instance of the service in the non-volatile memory with a read-write access right. The method comprises launching, by the processor, an executable instance of the service associated to the operational instance of the service. The launching comprises copying the instructions of the service from the non-volatile memory to a volatile memory of the computing device. The launching further comprises executing the instructions of the service copied into the volatile memory. The method further comprises adding, by the processor, data generated by the execution of the instructions of the service to the operational instance of the service for permanent storage in the non-volatile memory.

According to a second aspect, the present disclosure relates to a non-transitory computer program product comprising instructions executable by a processor of a computing device. The execution of the instructions by the processor of the computing device provides resilient execution of a service on the computing device, by implementing the aforementioned method.

In a particular aspect, upon occurrence of an interruption of the executable instance of the service, the processor launches a new executable instance of the service associated to the operational instance of the service, which uses the generated data previously added to the operational instance of the service.

In another particular aspect, the service further comprises service data which are used during the execution of the instructions of the service by the processor. The execution of the instructions of the service by the processor generates modifications to the service data, which are added by the processor to the operational instance of the service for permanent storage in the non-volatile memory.

In still another particular aspect, the execution of the instructions of the service by the processor generates modifications to the instructions of the service, which are added by the processor to the operational instance of the service for permanent storage in the non-volatile memory.

BRIEF DESCRIPTION OF THE DRAWINGS

Embodiments of the disclosure will be described by way of example only with reference to the accompanying drawings, in which:

FIG. 3A to 3I illustrate a resilient execution environment for services executed on the computing device of FIG. 1.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the resilient execution of a service by a computing device.

Figure 1:
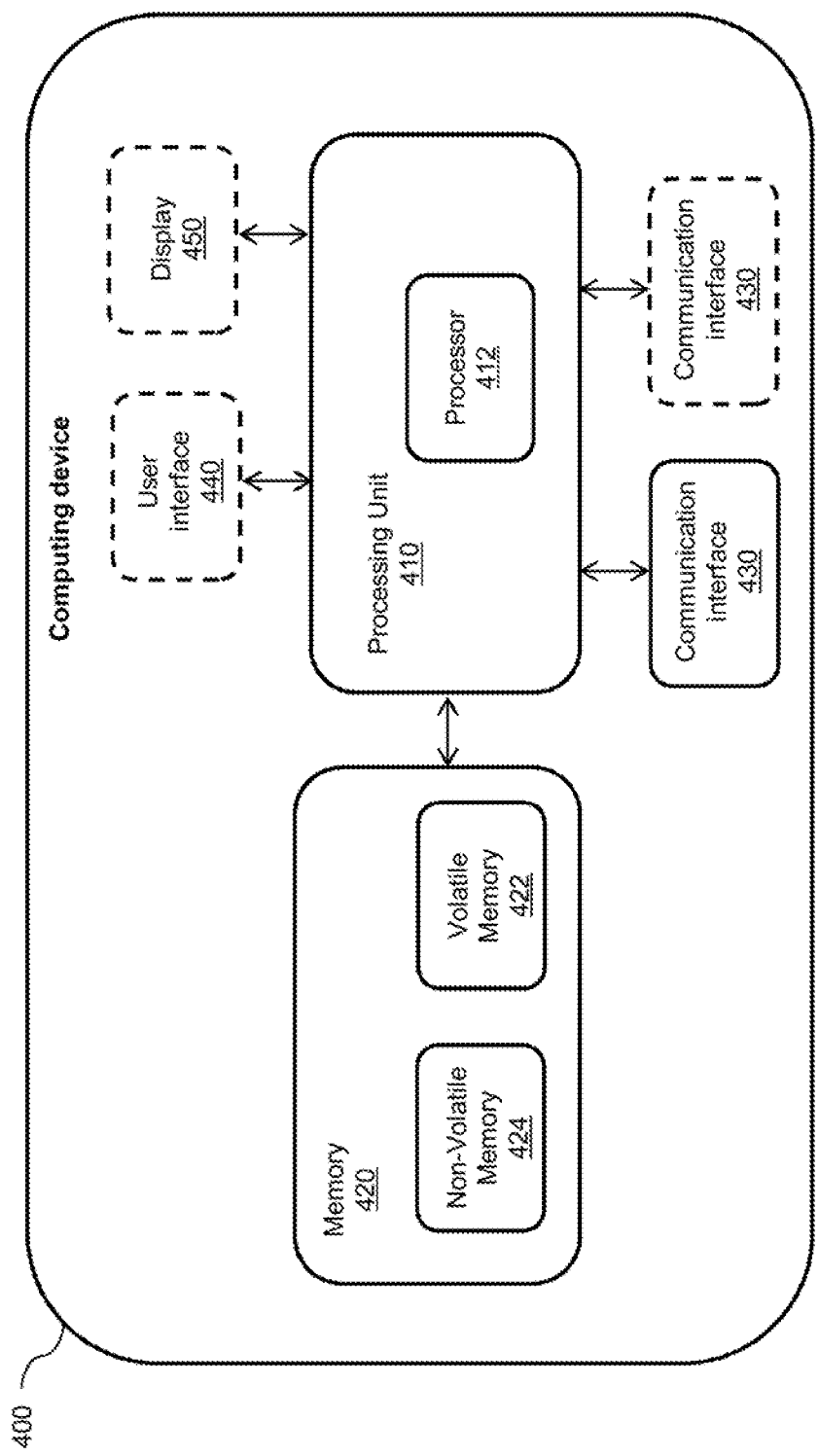
FIG. 1 represents components of a computing device.

Referring now to FIG. 1, a computing device 400 is represented.

The computing device 400 comprises a processing unit 410, memory 420, and a communication interface 430. The computing device 400 may comprise additional components, such as another communication interface 430, a user interface 440, a display 450, etc.

The processing unit 410 comprises one or more processor 412 capable of executing instructions of a computer program. Each processor may further comprise one or more core (not represented in FIG. 1). A single processor 412 is represented in FIG. 1 for illustration purposes.

The memory 420 stores instructions of computer program(s) executed by the processor(s) 412, data generated by the execution of the computer program(s), data received via the communication interface 430, etc. The memory 420 comprises volatile memory 422 (e.g. Random Access Memory (RAM), etc.) and non-volatile memory 424 (e.g. a hard drive, electrically-erasable programmable read-only memory (EEPROM), flash memory, etc.).

For instance, a computer program is stored in the non-volatile memory 424. The instructions of the computer program are loaded in the volatile memory 422 for being executed by the processor 412. The execution of the instructions by the processor 412 generates data stored in the volatile memory 422. Some of the generated data may be transferred in the non-volatile memory 424 for persistent storage.

The communication interface 430 allows the computing device 400 to exchange data with remote computing devices over a communication network (not represented in the Figures for simplification purposes). For example, the communication network is a wired communication network, such as an Ethernet network; and the communication interface 430 is adapted to support communication protocols used to exchange data over the Ethernet network. Other types of wired communication networks may also be supported by the communication interface 430. In another example, the communication network is a wireless communication network, such as a Wi-Fi network; and the communication interface 430 is adapted to support communication protocols used to exchange data over the Wi-Fi network. Other types of wireless communication network may also be supported by the communication interface 430, such as a wireless mesh network. In still another example, the computing device 400 comprises two communication interfaces 430: for example, a first communication interface 130 supports the Wi-Fi standard and a second communication interface supports the Bluetooth® or Bluetooth® Low Energy (BLE) standard. Each communication interface 430 usually comprises a combination of hardware and software executed by the hardware, for implementing the communication functionalities of the communication interface 430.

The computing device 400 may correspond to various types of devices, such as a server, a networking appliance, an industrial appliance, etc. The present disclosure is particularly adapted to computing devices 400 used in a context where software failures may have significant consequences.

The computing device 400 may include additional components (not represented in FIG. 1 for simplification purposes) for implementing additional functionalities.

In the rest of the description, the term instructions will refer to software instructions which constitute a software program and are executable by a processor.

Figure 2:
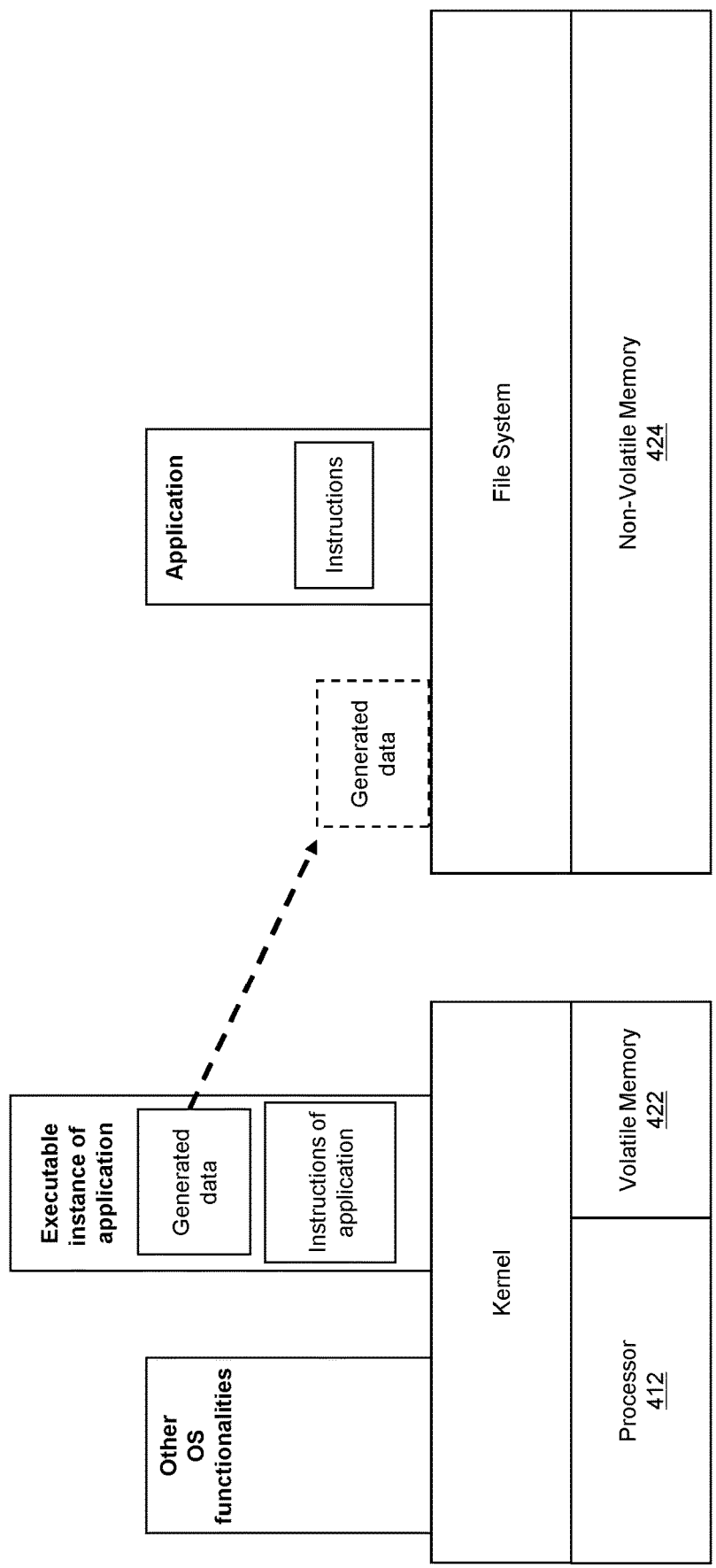
FIG. 2 illustrates a legacy execution environment for applications executed on the computing device of FIG. 1.

Referring now concurrently to FIGS. 1 and 2, a legacy execution environment for applications executed on the computing device 400 is illustrated. The execution environment represented in FIG. 2 is for illustration purposes only, and only aims at introducing the main functionalities of such an execution environment.

A file system is implemented by the non-volatile memory 424 for storing various types of files (e.g. data files, software files, etc.). The file system is a logical structure providing an abstraction layer above the hardware (the non-volatile memory 424).

An operating system (OS) is executed by the processor 412. The OS comprises a kernel, other OS functionalities, etc. The instructions of the kernel (not represented in FIG. 2 for simplification purposes) are stored in the volatile memory 422 and executed by the processor 412. The instructions of the other OS functionalities (not represented in FIG. 2 for simplification purposes) are also stored in the volatile memory 422 and executed by the processor 412.

The other OS functionalities are represented on top of the kernel, because the instructions of the other OS functionalities executed by the processor 412 make use of kernel functionalities provided when instructions of the kernel are executed by the processor 412.

The kernel and the other OS functionalities may also include configuration data stored in the volatile memory 422. These configuration data are not represented in FIG. 2 for simplification purposes.

The execution of the instructions of the kernel and of the other OS functionalities may also generate data stored in the volatile memory 422. These generated data are not represented in FIG. 2 for simplification purposes.

Although not represented in FIG. 2 for simplification purposes, the instructions of the kernel and of the other OS functionalities are also stored in the non-volatile memory 424 via the file system. Similarly, the configuration data of the kernel and of the other OS functionalities are also stored in the non-volatile memory 424 via the file system. These instructions and configuration data are transferred from the non-volatile memory 424 to the volatile memory 422 upon occurrence of particular events for launching the OS. Examples of particular events include a power on of the computing device 400, a reboot of the computing device 400, etc.

An application is stored in the non-volatile memory 424 via the file system. The application comprises instructions executable by the processor 412. For simplification purposes, the application does not have associated configuration data stored in the non-volatile memory 424 via the file system.

The processor 412 launches an executable instance of the application. The launching comprises copying (by the processor 412 the instructions of the application from the non-volatile memory 424 to the volatile memory 422.

The launching further comprises executing (by the processor 412) the instructions of the application copied into the volatile memory 422. The execution of the instructions of the application by the processor 412 generates data, which are stored (by the processor 412) into the volatile memory 422. At least some of the generated data may be copied (by the processor 412) from the volatile memory 422 into the non-volatile memory 424, for permanent storage via the file system.

The launching may comprise additional steps which are specific to the type of the OS currently operating on the computing device 400.

The executable instance of the application is represented on top of the kernel, because the instructions of the application executed by the processor 412 make use of kernel functionalities provided when instructions of the kernel are executed by the processor 412. The executable instance of the application may also use one or more functionalities among the other OS functionalities when the instructions of the application are executed by the processor 412 (either directly or via the kernel).

Although a single executable instance of the application is represented in FIG. 2, several executable instances of the application may be executed concurrently. Similarly, although a single application is represented in FIG. 2, a plurality of applications and a corresponding plurality of executable instances of the applications may be supported concurrently by the legacy execution environment.

Referring now concurrently to FIGS. 1 and 3A to 3I, a resilient execution environment for services executed on the computing device 400 is illustrated.

The term service is used in place of application, to differentiate from the application represented in FIG. 2, which was executed in the legacy execution environment. A person skilled in the art would readily understand that the terms application and service can be used interchangeably.

In a first implementation, the computing device 400 only supports the resilient execution environment for the services represented in FIGS. 3A-I. In an alternative implementation, the computing device 400 simultaneously supports the resilient execution environment for the services represented in FIGS. 3A-I and the legacy execution environment for the applications(s) represented in FIG. 2.

The features of the file system, the OS, the kernel, and the other OS functionalities, which have been described in the context of the legacy execution environment represented in FIG. 2, also apply to the resilient execution environment represented in FIGS. 3A-I. Additional features for supporting the service(s) represented in FIG. 3A-I will be detailed in the following paragraphs.

Figure 3A:
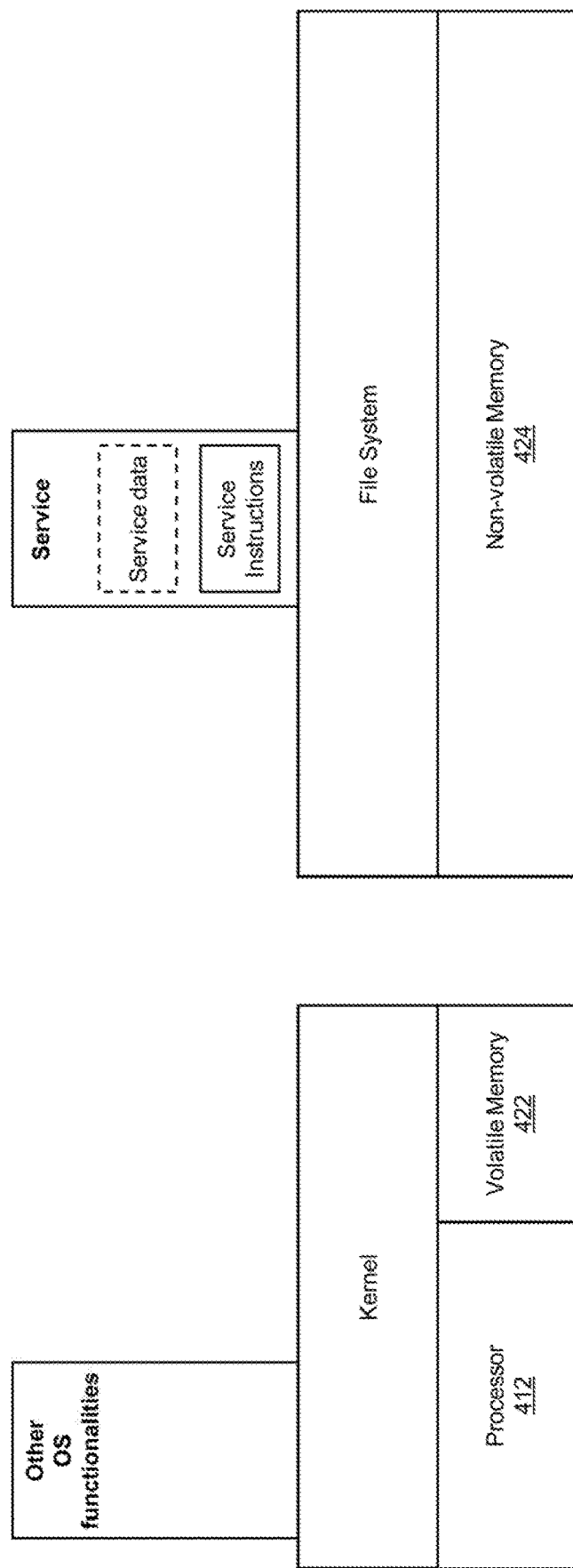

Referring now more specifically to FIG. 3A, a service is stored in the non-volatile memory 424 via the file system. The service comprises service instructions executable by the processor 412.

Optionally, the service also comprises service data stored in the non-volatile memory 424 via the file system. Examples of service data include configuration data for the service, a database associated to the service, etc.

The service instructions and the service data are stored in a common data structure supported by the file system. Alternatively, the service instructions and the service data are stored in two independent data structures supported by the file system. For example, the service is associated to a single file storing the service instructions and optionally the service data. Alternatively, the service is associated to a first file storing the service instructions and to a second file storing the service data.

The service generally has a read-only access right for regular users. Thus, the content of the service (the service instructions and optionally the service data) may only be read, but may not be modified. The various access rights supported by the file system are usually managed by the kernel. The service is installed (e.g. copied into the non-volatile memory 424) by an administrator (a human or an automatic procedure) with appropriate access rights (superior to the access rights of regular users). Over time, the administrator may remove the service or replace the current version of the service with a new version of the service. Except from the administrator, other users (a human or an automatic procedure) of the service only have the read-only access right, to avoid a corruption or an accidental removal of the service (thus supporting a resilient execution of the service). However, the teachings of the present disclosure are still applicable if the service is not limited to a read-only access right for regular users.

Figure 3B:
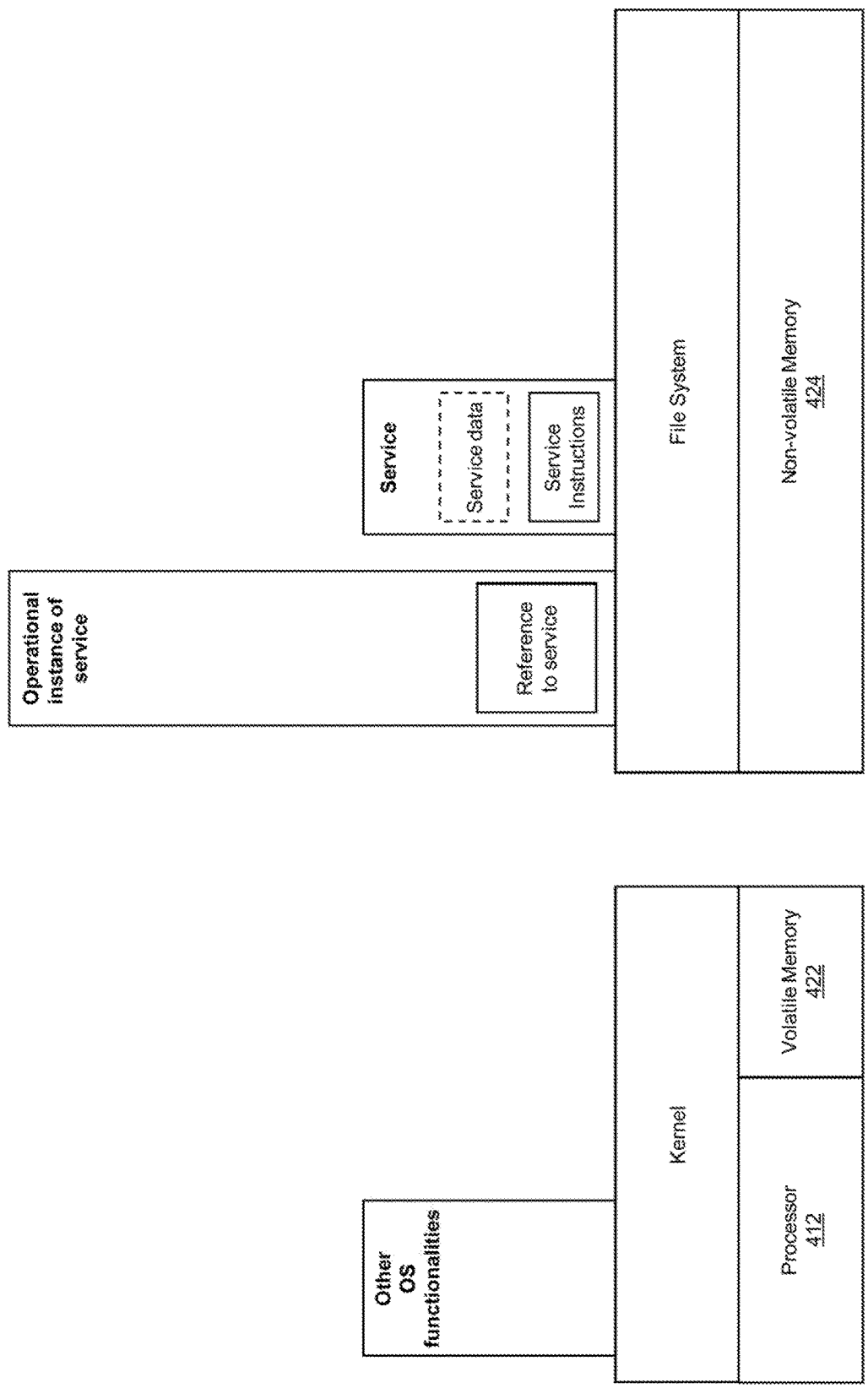

Referring now more specifically to FIG. 3B, an operational instance of the service is generated by the processor 412 (e.g. by executing instructions of the kernel). The operation instance of the service is further stored by the processor 412 (e.g. by executing instructions of the kernel) in the non-volatile memory 424 via the file system.

The operational instance of the service comprises a reference to the service. The reference to the service is stored in a data structure supported by the file system. Thus, the service instructions and optionally the service data are not copied in the data structure associated to the operational instance of the service. For example, the operational instance of the service is associated to a file storing the reference to the service.

The implementation of the reference to the service is dependent on the implementations of the file system and of the OS. For example, the reference to the service comprises one or more pointer to the one or more file associated to the service. In a first implementation, the reference to the service consists of a pointer to a single file comprising the service instructions and optionally the service data. In a second implementation, the reference to the service comprises a first pointer to a first file comprising the service instructions and a second pointer to a second file comprising the service data.

The operational instance of the service has a read-write access right. Thus, the content of the operational instance of the service may not only be read, but also modified. Use cases where a modification of the content of the operational instance of the service occurs will be detailed later in the description.

Referring now more specifically to FIG. 3C, an executable instance of the service is launched by the processor 412 (e.g. by executing instructions of the kernel). The executable instance of the service is associated to the operational instance of the service stored in the non-volatile memory 424. The implementation of the association between the executable and operational instances of the service is dependent on the implementation of the OS and of the file system. For example, the kernel maintains an association between an identifier corresponding to the executable instance of the service (e.g. a process identifier) and a name and a path of a file corresponding to the operational instance of the service.

The launching comprises copying (by the processor 412) the service instructions from the non-volatile memory 424 to the volatile memory 422. The launching further comprises executing (by the processor 412) the service instructions copied into the volatile memory 422.

As mentioned previously, the launching may further comprise additional steps which are specific to the type of the OS currently operating on the computing device 400

As mentioned previously, the service instructions executed by the processor 412 make use of kernel functionalities provided when instructions of the kernel are executed by the processor 412. The executable instance of the service may also use one or more functionality among the other OS functionalities when the service instructions are executed by the processor 412 (either directly or via the kernel).

The execution of the service instructions by the processor 412 generates data, which are stored (by the processor 412) in the volatile memory 422.

In the implementation illustrated in FIG. 1, the volatile memory 422 is independent of the processing unit 410 comprising the processor 412. In an alternative implementation, the volatile memory 422 is integrated to the processing unit 410 and dedicated to the processor 412.

Figure 3D:
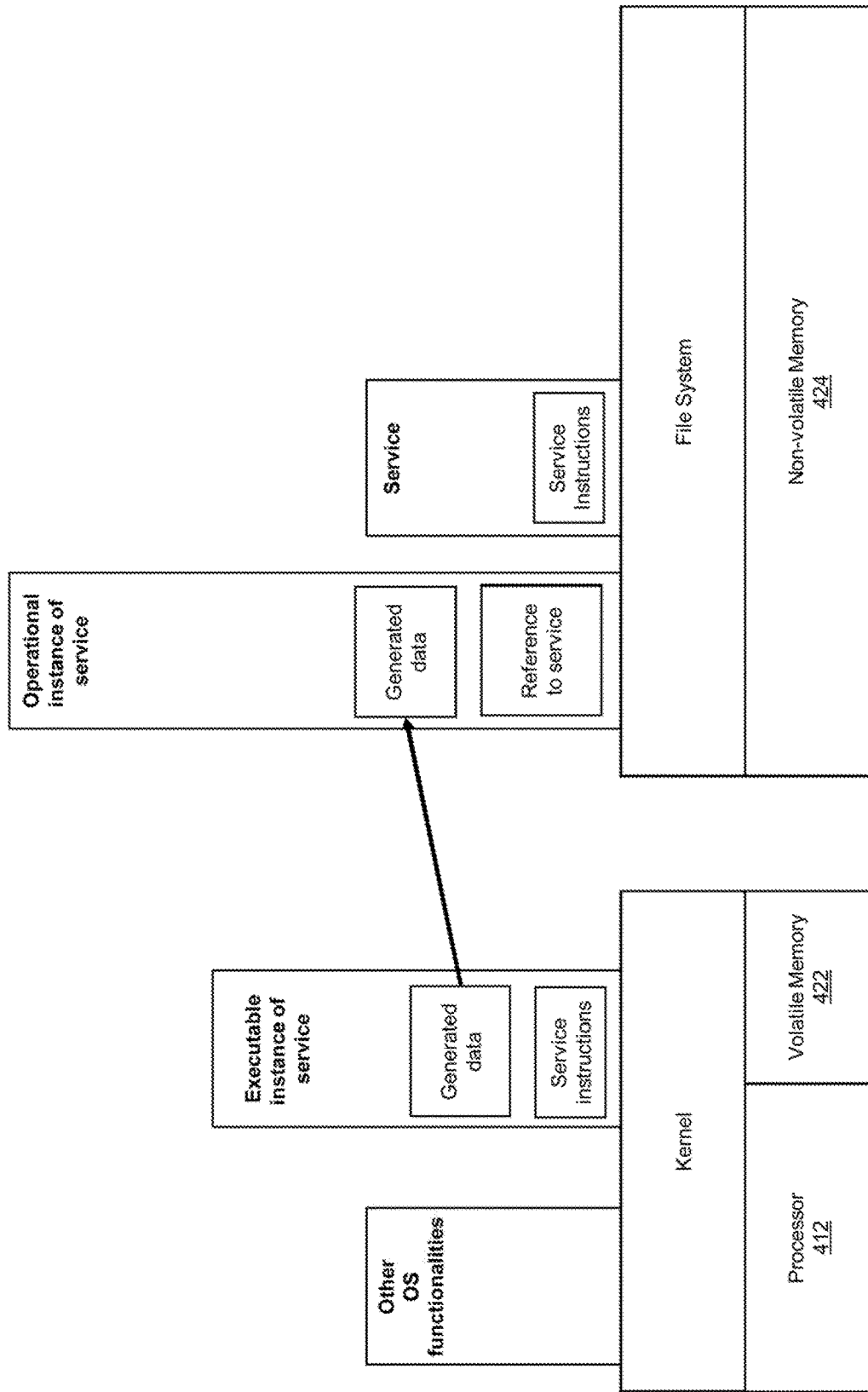

Referring now more specifically to FIG. 3D, at least some of the data generated by the execution of the service instructions are added (by the processor 412) to the operational instance of the service, for permanent storage in the non-volatile memory 424. For example, at least some of the data generated by the execution of the service instructions are copied (by the processor 412) from the volatile memory 422 to the file (in the non-volatile memory 424) associated to the operational instance of the service.

In the rest of the description, adding new data to the operational instance of the service shall be interpreted as follows. The operational instance of the service comprises a current set of data (e.g. stored in a file associated to the operational instance of the service). The new data are added to (incorporated into) the current set of data, creating a new set of data (e.g. stored in the file associated to the operational instance of the service).

One benefit of this functionality is that in case of an interruption of the executable instance of the service, the generated data added to the operational instance of the service (and permanently stored in the non-volatile memory 424) are not affected, while the generated data only stored in the volatile memory 422 may be deleted, corrupted, etc. Thus, a new executable instance of the service can be launched, using the generated data previously added to the operational instance of the service (and permanently stored in the non-volatile memory 424) to start from a state of the executable instance of the service substantially similar to the state before the occurrence of the interruption (thus supporting a resilient execution of the service).

The launch of the new executable instance of the service is similar to the previously described launch of the original executable instance of the service. In addition, the processor 412 copies the generated data previously added to the operational instance of the service from the non-volatile memory 424 to the volatile memory 422. The generated data copied into the volatile memory 422 are used during the new execution of the service instructions by the processor 412.

For example, the generated data comprise a given data structure comprising several values (e.g. an array of data). During the execution of the service instructions by the processor 412, the given data structure is generated by calculating the several values of the given data structure, and then added to the operational instance of the service. More specifically, the given data structure comprised in the operational instance of the service includes the several values of the given data structure, as well as an indication that these values correspond to the given data structure. Upon occurrence of an interruption of the original executable instance of the service, the new executable instance of the service is launched, and the given data structure is populated with the values previously added to the operational instance of the service.

Examples of an interruption of the original executable instance of the service include: an occurrence of a fatal error in the execution by the processor 412 of the instructions of the service, an occurrence of a fatal error in the execution by the processor 412 of the instructions of another software (e.g. the instructions of the application represented in FIG. 2) affecting the execution by the processor 412 of the instructions of the service, a reboot of the computing device 400, an interaction of a user with the optional user interface 440 of the computing device 400 represented in FIG. 1 causing the interruption of the original executable instance of the service, a reception of a command via the communication interface 430 of the computing device 400 represented in FIG. 1 causing the interruption of the original executable instance of the service, etc.

In a first implementation of the launch of the new executable instance of the service, all the data generated by the execution of the service instructions are added to the operational instance of the service, for permanent storage in the non-volatile memory 424. Alternatively, only data (generated by the execution of the service instructions) critical for the launch of the new executable instance of the service are added to the operational instance of the service, for permanent storage in the non-volatile memory 424.

The functionality of adding data generated by the execution of the service instructions to the operational instance of the service (for permanent storage in the non-volatile memory 424) may be integrated to the service instructions, provided by the kernel, provided by one of the other OS functionalities, or a combination thereof.

Another functionality consists in, upon detection of a particular event, removing by the processor 412 from the non-volatile memory 424 the operational instance of the service (comprising the generated data previously added to the operational instance of the service). For example, the event is a detection of an issue with the executable instance of the service. The processor 412 removes the operational instance of the service associated to the executable instance of the service from the non-volatile memory 424 (and stops the execution of the executable instance of the service). In another example, the event is a factory reset of the computing device 400. The processor 412 removes all the operational instances of all the services from the non-volatile memory 424. This other functionality also provides support for a resilient execution of the service. This other functionality may be provided by the kernel, provided by one of the other OS functionalities, or a combination thereof.

Following is an exemplary scenario combining the previously mentioned functionalities providing resilient execution of the service. In case of an interruption of the executable instance of the service, one or more attempts are made at launching a new executable instance of the service, using the generated data previously added to the operational instance of the service. In case of failure, the operational instance of the service (comprising the generated data previously added to the operational instance of the service) is removed from the non-volatile memory 424.

Figure 3E:
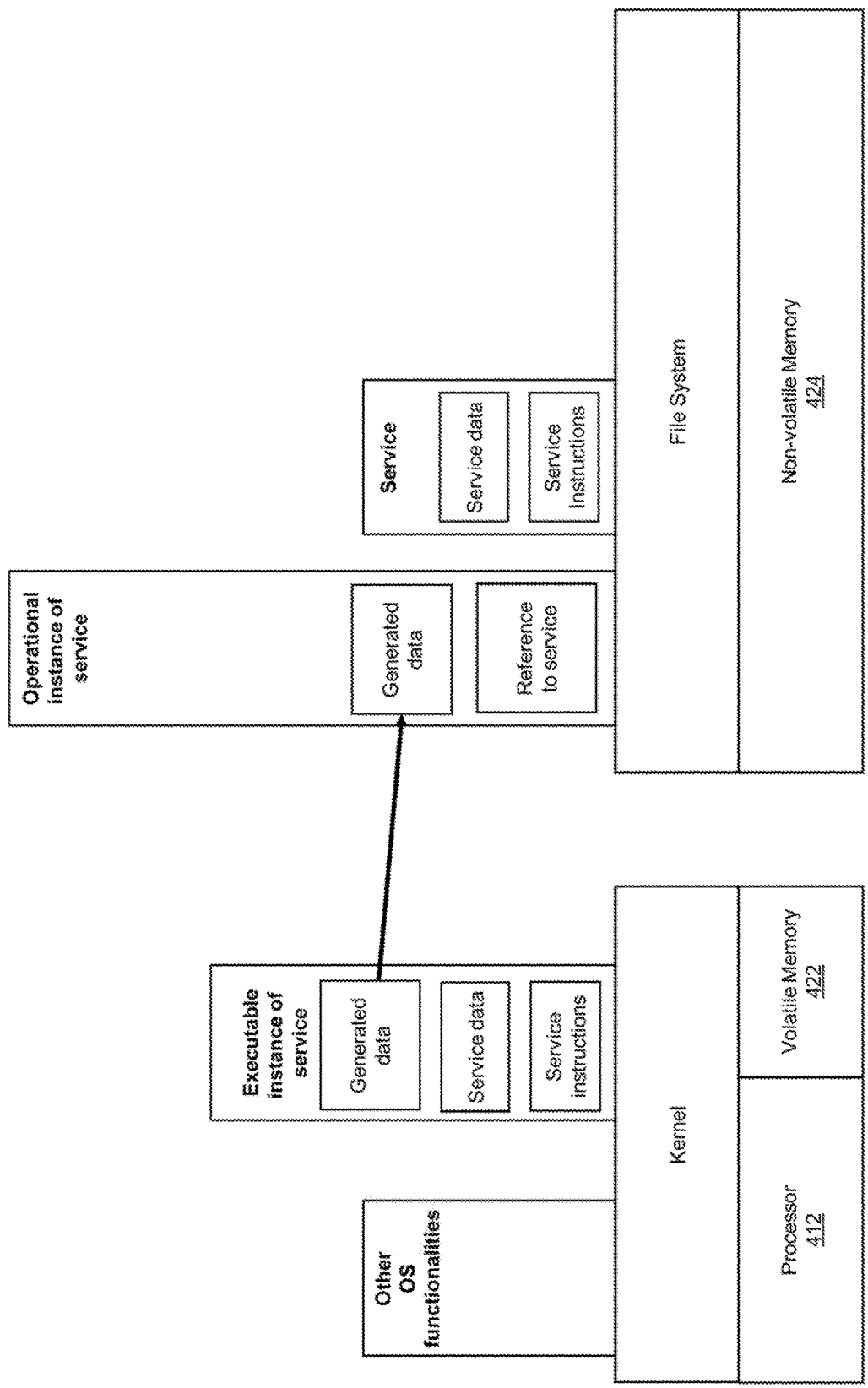

Referring now more specifically to FIG. 3E, the service comprises service data. The service data have been described previously with reference to FIGS. 3A and 3B. For example, the service data are stored in a file associated to the service in the non-volatile memory 424. As mentioned previously, the same file or different files may be used for storing the service instructions and the service data included in the service.

The launching of the executable instance of the service (described previously with reference to FIG. 3C) comprises the additional step of copying (by the processor 412) the service data from the non-volatile memory 424 to the volatile memory 422. The execution (by the processor 412) of the service instructions uses the service data copied into the volatile memory 422.

As mentioned previously, the execution of the service instructions by the processor 412 generates data, which are stored (by the processor 412) in the volatile memory 422. At least some of the generated data are further added to the operational instance of the service, for permanent storage in the non-volatile memory 424.

Figure 3F:
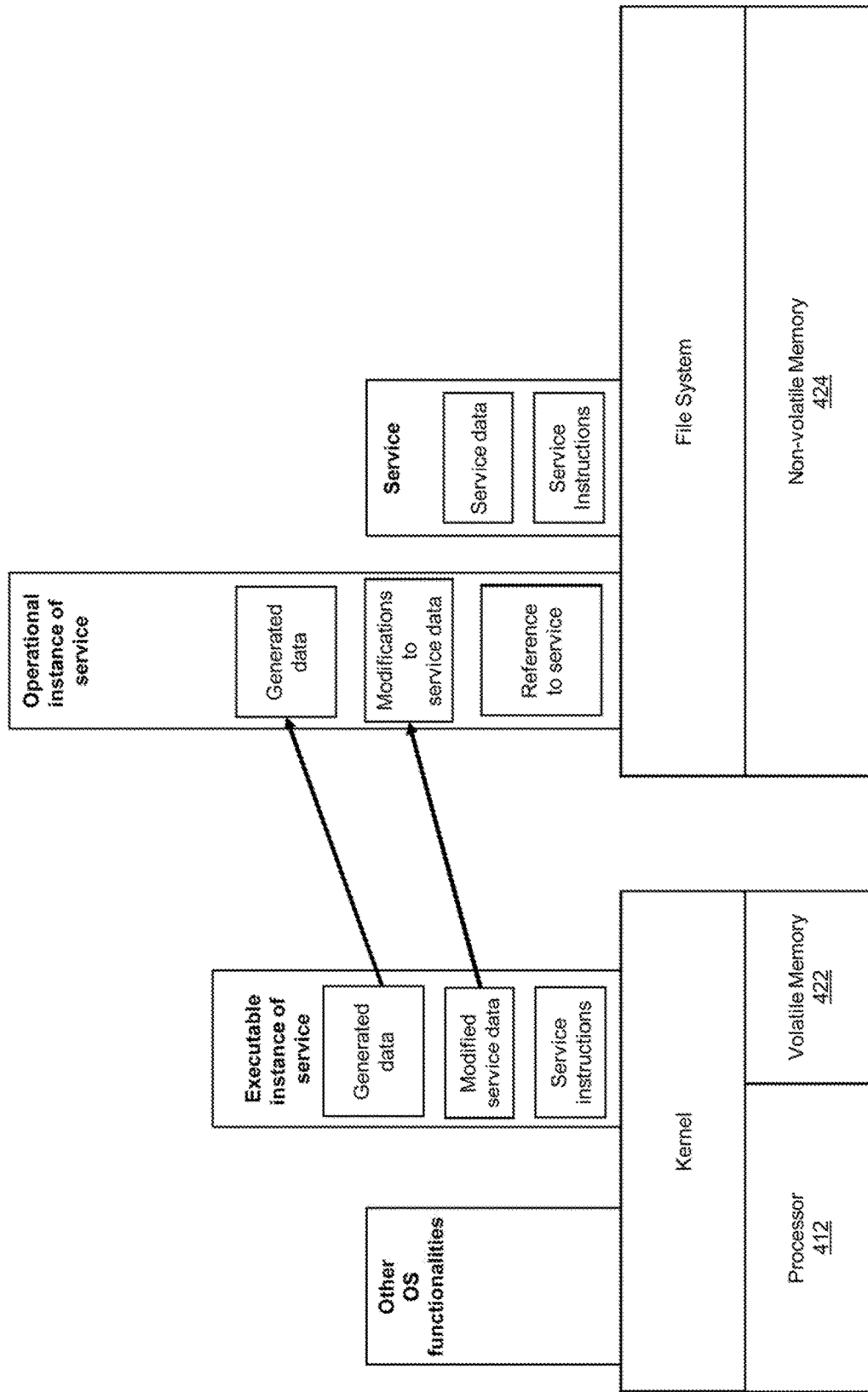

Referring now more specifically to FIG. 3F, the execution (by the processor 412) of the service instructions generates modifications to the service data copied into the volatile memory 422.

At least some of the service data modified by the execution of the service instructions are added (by the processor 412) to the operational instance of the service, for permanent storage in the non-volatile memory 424. For example, at least some of the service data modified by the execution of the service instructions are copied (by the processor 412) from the volatile memory 422 to the file (in the non-volatile memory 424) associated to the operational instance of the service.

As mentioned previously, one benefit of this functionality is that in case of an interruption of the executable instance of the service, the modifications to the service data added to the operational instance of the service (and permanently stored in the non-volatile memory 424) are not affected, while the modifications to the service data only stored in the volatile memory 422 may be deleted, corrupted, etc. Thus, a new executable instance of the service can be launched, using the modifications to the service data previously added to the operational instance of the service (and permanently stored in the non-volatile memory 424) to start from a state of the executable instance of the service substantially similar to the state before the occurrence of the interruption (thus supporting a resilient execution of the service).

The launch of the new executable instance of the service is similar to the previously described launch of the original executable instance of the service. In addition, the processor 412 copies the modifications to the service data previously added to the operational instance of the service (and permanently stored in the non-volatile memory 424) into the volatile memory 422. The modifications to the service data copied into the volatile memory 422 are used during the new execution of the service instructions by the processor 412.

In a first exemplary implementation of the launch of the new executable instance of the service, all the original service data included in the service are copied into the volatile memory 422. Then, some of the original service data copied into the volatile memory 422 are overwritten by the modifications to the service data previously added to the operational instance of the service, which are copied into the volatile memory 422. In a second exemplary implementation, only the original service data included in the service which have not been modified are copied into the volatile memory 422. Then, the modifications to the service data previously added to the operational instance of the service are copied into the volatile memory 422. These mechanisms may be implemented by the kernel, by one of the other OS functionalities, by the service instructions, or a combination thereof.

For example, the service data comprise a first default Internet Protocol (IP) address of a first computing device used by the service and a second default IP address of a second computing device used by the service. During the execution of the service instructions by the processor 412, the first IP address is modified to a new value, which is added to the operational instance of the service. More specifically, the modifications to the service data comprised in the operational instance of the service include the new value, as well as an indication that this new value corresponds to the first IP address originally stored in the service data of the service. Upon occurrence of an interruption of the original executable instance of the service, the new executable instance of the service is launched, using the modified value comprised in the operational instance of the service for the first IP address and the default value comprised in the service data for the second IP address.

As mentioned previously, in a first implementation, all the service data modified by the execution of the service instructions are added to the operational instance of the service, for permanent storage in the non-volatile memory 424. Alternatively, only service data (modified by the execution of the service instructions) critical for the launch of the new executable instance of the service are added to the operational instance of the service, for permanent storage in the non-volatile memory 424.

As mentioned previously, the functionality of adding service data modified by the execution of the service instructions to the operational instance of the service (for permanent storage in the non-volatile memory 424) may be integrated to the service instructions, provided by the kernel, provided by one of the other OS functionalities, or a combination thereof.

Another functionality consists in, upon detection of a particular event, removing by the processor 412 from the non-volatile memory 424 the operational instance of the service (comprising the modified service data previously added to the operational instance of the service). For example, the event is a detection of an issue with the executable instance of the service. The processor 412 removes the operational instance of the service associated to the executable instance of the service from the non-volatile memory 424 (and stops the execution of the executable instance of the service). In another example, the event is a factory reset of the computing device 400. The processor 412 removes all the operational instances of all the services from the non-volatile memory 424. This other functionality also provides support for a resilient execution of the service. This other functionality may be provided by the kernel, provided by one of the other OS functionalities, or a combination thereof.

Following is an exemplary scenario combining the previously mentioned functionalities providing resilient execution of the service. In case of an interruption of the executable instance of the service, one or more attempt is made at launching a new executable instance of the service, using the generated data and the modified service data previously added to the operational instance of the service. In case of failure, the operational instance of the service (comprising the generated data and the modified service data previously added to the operational instance of the service) is removed from the non-volatile memory 424.

FIG. 3F illustrates the operational instance of the service including the generated data (previously described with reference to FIG. 3D) and the modifications to the service data, which have been added by the processor 412 during execution of the service instructions.

Figure 3G:
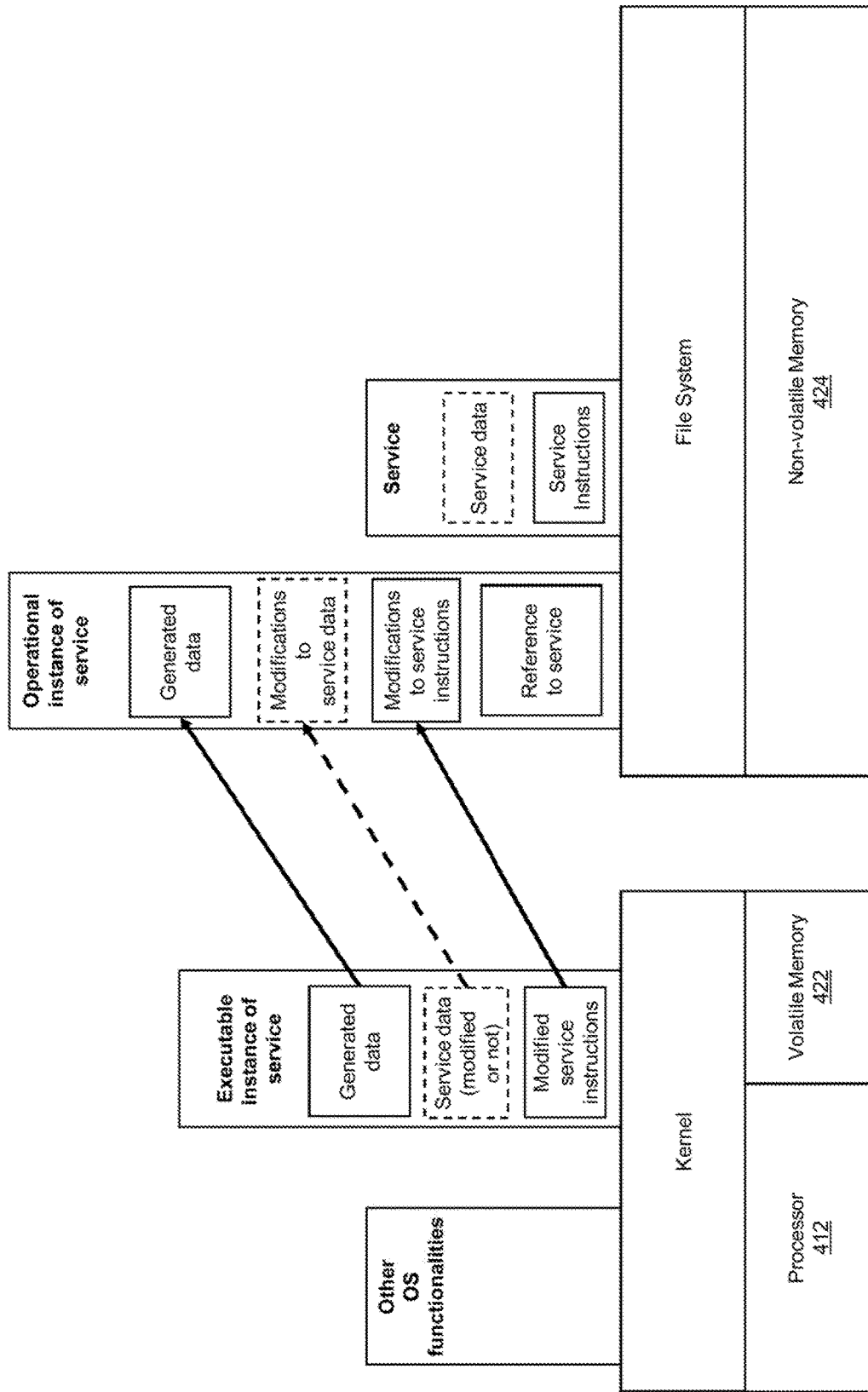

Referring now more specifically to FIG. 3G, the execution (by the processor 412) of the service instructions generates modifications to the service instructions copied into the volatile memory 422.

At least some of the service instructions modified by the execution of the service instructions are added (by the processor 412) to the operational instance of the service, for permanent storage in the non-volatile memory 424. For example, at least some of the service instructions modified by the execution of the service instructions are copied (by the processor 412) from the volatile memory 422 to the file (in the non-volatile memory 424) associated to the operational instance of the service.

As mentioned previously, one benefit of this functionality is that in case of an interruption of the executable instance of the service, the modifications to the service instructions added to the operational instance of the service (and permanently stored in the non-volatile memory 424) are not affected, while the modifications to the service instructions only stored in the volatile memory 422 may be deleted, corrupted, etc. Thus, a new executable instance of the service can be launched, using the modifications to the service instructions previously added to the operational instance of the service (and permanently stored in the non-volatile memory 424) to start from a state of the executable instance of the service substantially similar to the state before the occurrence of the interruption (thus supporting a resilient execution of the service).

The launch of the new executable instance of the service is similar to the previously described launch of the original executable instance of the service. In addition, the processor 412 copies the modifications to the service instructions previously added to the operational instance of the service (and permanently stored in the non-volatile memory 424) into the volatile memory 422. The modifications to the service instructions copied in the volatile memory 422 are used during the new execution of the service instructions by the processor 412.

In a first exemplary implementation of the launch of the new executable instance of the service, all the original service instructions included in the service are copied into the volatile memory 422. Then, some of the original service instructions copied into the volatile memory 422 are overwritten by the modifications to the service instructions previously added to the operational instance of the service, which are copied into the volatile memory 422. In a second exemplary implementation, only the original service instructions included in the service which have not been modified, are copied into the volatile memory 422. Then, the modifications to the service instructions previously added to the operational instance of the service are copied into the volatile memory 422. These mechanisms may be implemented by the kernel, by one of the other OS functionalities, or a combination thereof.

For example, the service instructions of the service comprise a first default software module used by the service for implementing a first functionality of the service and a second default software module used by the service for implementing a second functionality of the service. During the execution of the service instructions by the processor 412, the first software module is modified by replacing the default software module with a new software module downloaded from a remote server. The modified first software module is added to the operational instance of the service. More specifically, the modifications to the service instructions comprised in the operational instance of the service include the new software module, as well as an indication that this new software module corresponds to the first software module (implementing the first functionality) included in the service. Upon occurrence of an interruption of the original executable instance of the service, the new executable instance of the service is launched, using the modified software module comprised in the operational instance of the service for the first software module and the default software module comprised in the service for the second software module.

As mentioned previously, in a first implementation, all the service instructions modified by the execution of the service instructions are added to the operational instance of the service, for permanent storage in the non-volatile memory 424. Alternatively, only service instructions (modified by the execution of the service instructions) critical for the launch of the new executable instance of the service are added to the operational instance of the service, for permanent storage in the non-volatile memory 424.

As mentioned previously, the functionality of adding service instructions modified by the execution of the service instructions to the operational instance of the service (for permanent storage in the non-volatile memory 424) may be integrated to the service instructions, provided by the kernel, provided by one of the other OS functionalities, or a combination thereof.

FIG. 3G illustrates the operational instance of the service including the generated data (previously described with reference to FIG. 3D), the modifications to the service instructions and optionally modifications to the service data (previously described with reference to FIG. 3F), which have been added by the processor 412 during execution of the service instructions.

Another functionality consists in, upon detection of a particular event, removing by the processor 412 from the non-volatile memory 424 the operational instance of the service (comprising the modified service instructions previously added to the operational instance of the service). For example, the event is a detection of an issue with the executable instance of the service. The processor 412 removes the operational instance of the service associated to the executable instance of the service from the non-volatile memory 424 (and stops the execution of the executable instance of the service). In another example, the event is a factory reset of the computing device 400. The processor 412 removes all the operational instances of all the services from the non-volatile memory 424. This other functionality also provides support for a resilient execution of the service. This other functionality may be provided by the kernel, provided by one of the other OS functionalities, or a combination thereof.

Following is an exemplary scenario combining the previously mentioned functionalities providing resilient execution of the service. In case of an interruption of the executable instance of the service, one or more attempt is made at launching a new executable instance of the service, using the generated data and the modified service instructions (and optionally modified service data) previously added to the operational instance of the service. In case of failure, the operational instance of the service (comprising the generated data and the modified service instructions (and optionally modified service data) previously added to the operational instance of the service) is removed from the non-volatile memory 424.

Figure 3H:
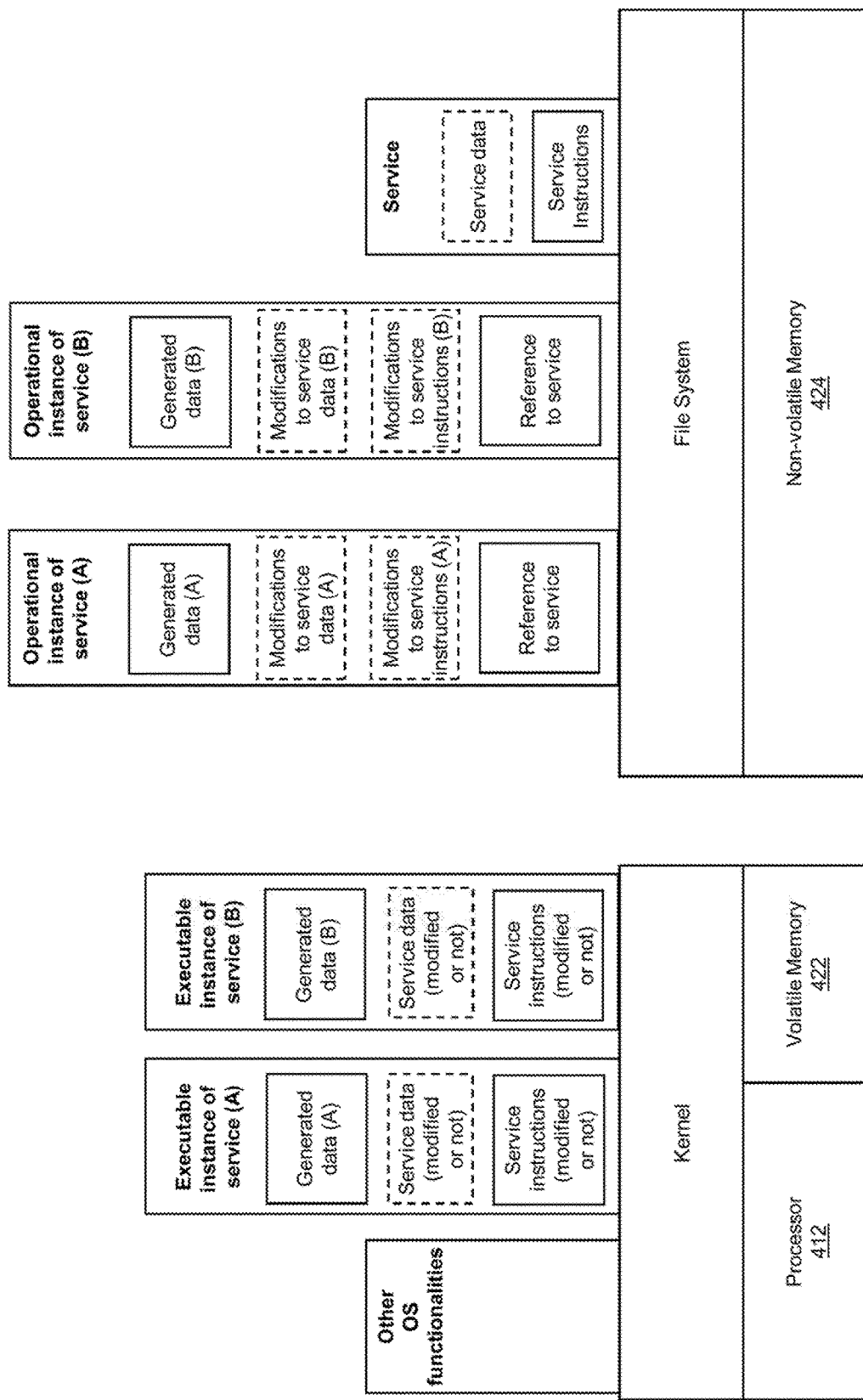

Referring now more specifically to FIG. 3H, several operational instances of the service are generated, and several corresponding executable instances of the service are launched.

For illustration purposes, FIG. 3H represents two operational instances of the service and two corresponding executable instances of the service, but any number of operational and corresponding executable instances supported by the OS may be respectively generated and launched.

As described previously, the service comprises the service instructions and optionally the service data.

The first operational instance of the service (A) is generated with a reference to the service, and stored in the non-volatile memory 424.

The corresponding first executable instance of the service (A) is launched. A copy of the service instructions in the volatile memory 422 is performed for instance (A). Optionally, a copy of the service data in the volatile memory 422 is also performed (if the service comprises service data) for instance (A). At least some of the data generated by the execution of the service instructions by the processor 422 are added to the operational instance of the service (A). If the execution of the service instructions by the processor 422 generates modified service data, at least some of these modified service data are added to the operational instance of the service (A). If the execution of the service instructions by the processor 422 generates modified service instructions, at least some of these modified service instructions are added to the operational instance of the service (A).

The second operational instance of the service (B) is generated with a reference to the service, and stored in the non-volatile memory 424.

The corresponding second executable instance of the service (B) is launched. A copy of the service instructions in the volatile memory 422 is performed for instance (B). Optionally, a copy of the service data in the volatile memory 422 is also performed (if the service comprises service data) for instance (B). At least some of the data generated by the execution of the service instructions by the processor 422 are added to the operational instance of the service (B). If the execution of the service instructions by the processor 422 generates modified service data, at least some of these modified service data are added to the operational instance of the service (B). If the execution of the service instructions by the processor 422 generates modified service instructions, at least some of these modified service instructions are added to the operational instance of the service (B).

Figure 3I:
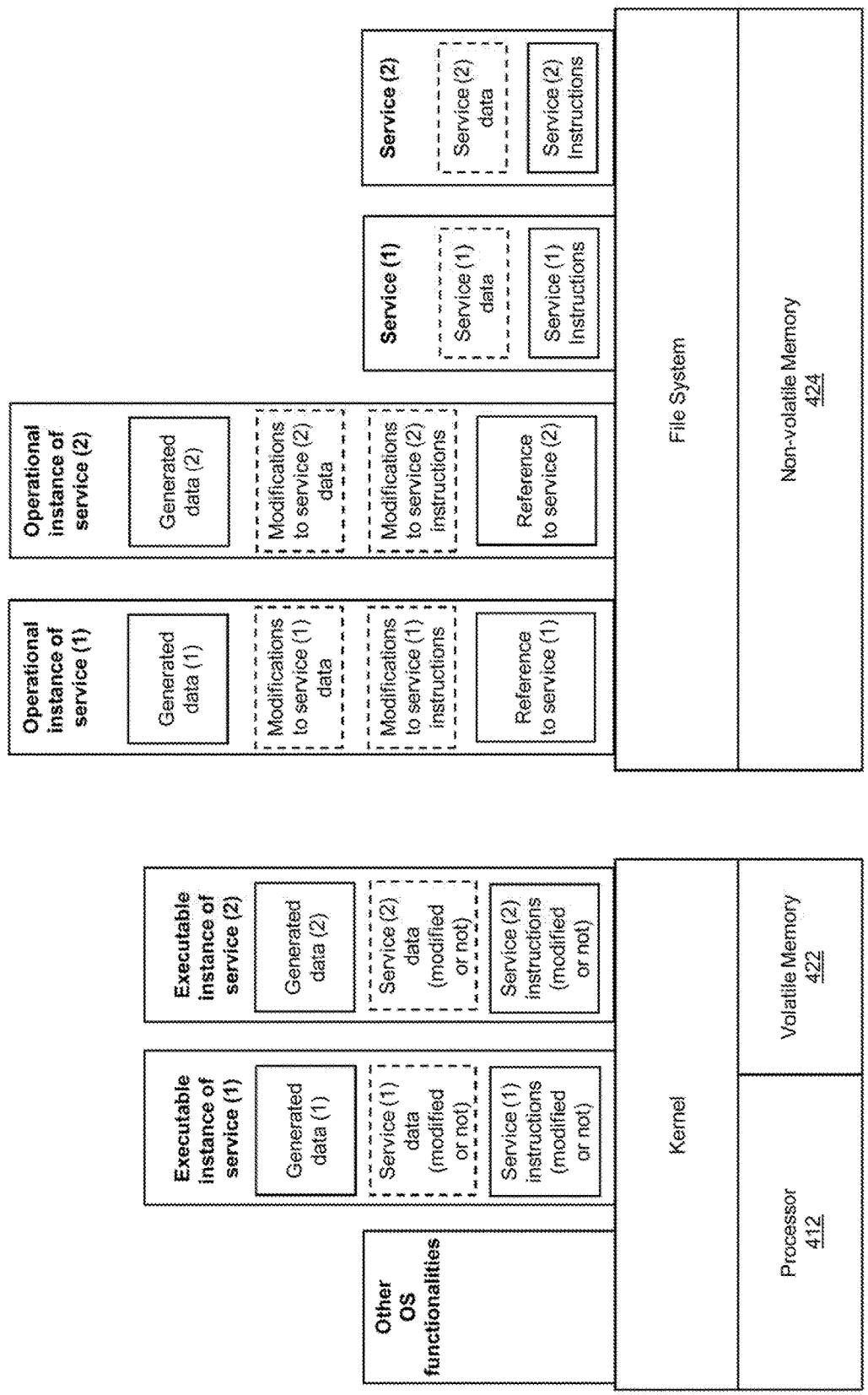

Referring now more specifically to FIG. 3I, several services are supported by the OS, one or more operational instance is generated for each service, and one or more corresponding executable instance of the service is launched for each service.

For illustration purposes, FIG. 3I represents two different services (1) and (2), but any number of services may be supported by the OS.

For simplification purposes, FIG. 3I represents one operational instance for each service (1) and (2), and one corresponding executable instance for each service (1) and (2). The case with several operational and corresponding executable instances for a service has been previously described with reference to FIG. 3H.

As described previously, each service (1) and (2) comprises its own service instructions and optionally its own service data.

The operational instance of the service (1) is generated with a reference to service (1), and stored in the non-volatile memory 424.

The corresponding executable instance of service (1) is launched. A copy of the service (1) instructions in the volatile memory 422 is performed. Optionally, a copy of the service (1) data in the volatile memory 422 is also performed (if service (1) comprises service data). At least some of the data generated by the execution of the service (1) instructions by the processor 422 are added to the operational instance of service (1). If the execution of the service (1) instructions by the processor 422 generates modified service data, at least some of these modified service data are added to the operational instance of service (1). If the execution of the service (1) instructions by the processor 422 generates modified service instructions, at least some of these modified service instructions are added to the operational instance of service (1).

The operational instance of service (2) is generated with a reference to service (2), and stored in the non-volatile memory 424.

The corresponding executable instance of service (2) is launched. A copy of the service (2) instructions in the volatile memory 422 is performed. Optionally, a copy of the service (2) data in the volatile memory 422 is also performed (if service (2) comprises service data). At least some of the data generated by the execution of the service (2) instructions by the processor 422 are added to the operational instance of service (2). If the execution of the service (2) instructions by the processor 422 generates modified service data, at least some of these modified service data are added to the operational instance of service (2). If the execution of the service (2) instructions by the processor 422 generates modified service instructions, at least some of these modified service instructions are added to the operational instance of service (2).

It should be noted that during a given period of time, when several services are stored in the non-volatile memory 424, one or more operational instance may be generated, and one or more corresponding executable instance may be launched, only for a subset of all the services stored in the non-volatile memory 424.

Reference is now made concurrently to FIGS. 1, 3A and 3B.

The processor receives the service (e.g. one or more files associated to the service) via the communication interface 430 from a remote computing device (not represented in FIG. 1), and stores the received service (e.g. the one or more files associated to the service) in the non-volatile memory 424.

The processor 412 may receive a new version of the service via the communication interface 430 from a remote computing device (not represented in FIG. 1). The processor 412 stores the new version of the service in the non-volatile memory 424. The reference to the service is associated to the new version of the service for each newly generated operational instance of the service. The original version of the service may be maintained in the non-volatile memory 424 as long as executable instances of the service based on the original version of the service are currently executing.

Alternatively, the original and the new versions of the service are simultaneously maintained in the non-volatile memory 424. The reference to the service is associated to one of the original or the new version of the service for each newly generated operational instance of the service. More generally, a plurality of versions of the service may be simultaneously maintained in the non-volatile memory 424, with a plurality of operational instances of the service being respectively associated with anyone among the plurality of versions of the service (via respective references to a selected one among the plurality of versions of the service), and with a plurality of executable instances of the service associated to the plurality of operational instances of the service.

Figure 4A:
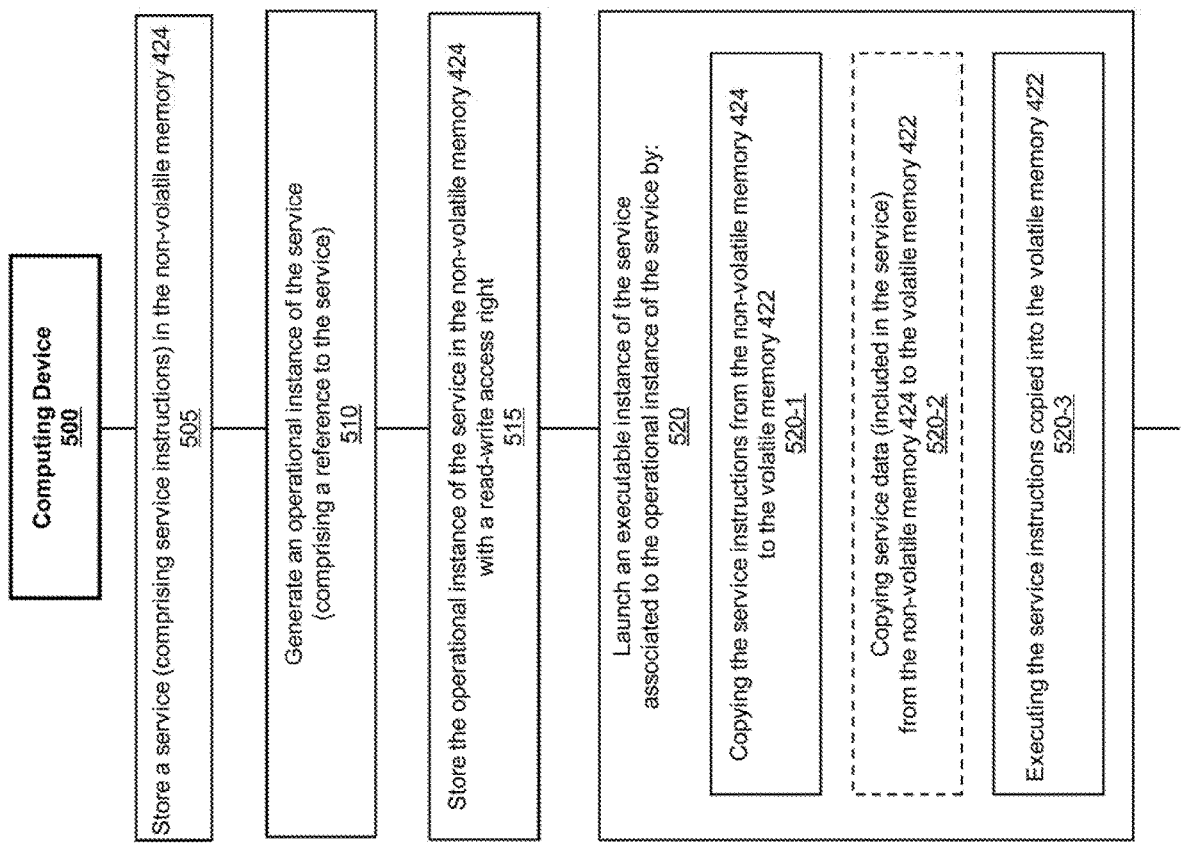
FIGS. 4A and 4B represent a method for resilient execution of a service on the computing device of FIG. 1.
Figure 4B:
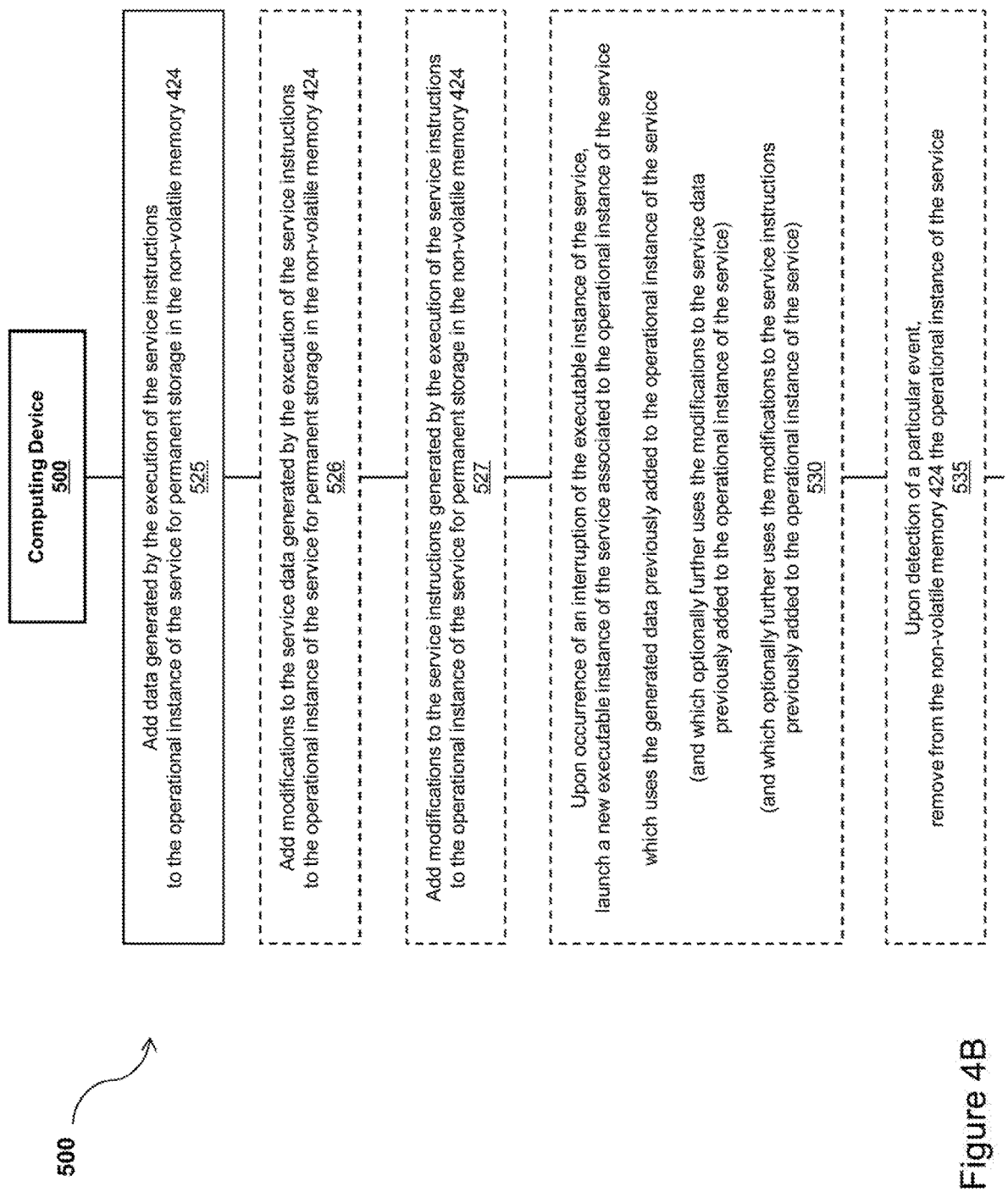

Reference is now made concurrently to FIGS. 1, 4A and 4B, where FIGS. 4A and 4B represent a method providing resilient execution of a service on a computing device. At least some of the steps of the method 500 represented in FIGS. 4A and 4B are implemented by the computing device 400 of FIG. 1, to provide a resilient execution of a service on the computing device 400.

A dedicated computer program has instructions for implementing at least some of the steps of the method 500. The instructions are comprised in a non-transitory computer program product (e.g. the non-volatile memory 424) of the computing device 400. The instructions provide for resilient execution of a service by the computing device 400, when executed by the processor 412 of the computing device 400. The instructions are deliverable to the computing device 400 via an electronically-readable media such as a storage media (e.g. CD-ROM, USB key, etc.), or via communication links (e.g. via a communication network through the communication interface 430).

All the features which have been previously described in relation to FIGS. 3A-I are applicable to the method 500, even when not specifically mentioned in the following paragraphs.

The method 500 comprises the step 505 of storing a service in the non-volatile memory 424 of the computing device 400 (as illustrated in FIG. 3A). The service comprises instructions executable by the processor 412. As mentioned previously, the service generally has a read-only access right. However, the method 500 is still applicable if the service is not limited to a read-only access right.

For example, the processor 412 receives the service via the communication interface 430 of the computing device 400 and the processor 412 copies the service into the non-volatile memory 424 for permanent storage (with the desired access-right, for instance read-only).

The method 500 comprises the step 510 of generating an operational instance of the service, the operational instance of the service comprising a reference to the service (as illustrated in FIG. 3B). Step 510 is executed by the processor 412.

The method 500 comprises the step 515 of storing the operational instance of the service (generated at step 510) in the non-volatile memory 424 with a read-write access right (as illustrated in FIG. 3B). Step 515 is executed by the processor 412. The read-write access right provides for the content of the operational instance of the service to be not only read, but also modified.

For example, the service is associated to a file storing the instructions of the service, and the operational instance of the service is associated to a file storing the reference to the service. The reference to the service comprises a pointer to the file(s) associated to the service.

The method 500 comprises the step 520 of launching an executable instance of the service associated to the operational instance of the service generated at step 510 (as illustrated in FIG. 3C). Step 520 is executed by the processor 412.

The launching comprises the sub-step 520-1 of storing (by the processor 412) the service instructions in the volatile memory 422, by copying the service instructions from the non-volatile memory 424 to the volatile memory 422. The launching further comprises the sub-step 520-3 of executing (by the processor 412) the service instructions copied into the volatile memory 422 at step 520-1. As mentioned previously, the launching may further comprise additional sub-steps (not represented in FIG. 3A), which are specific to the type of the OS currently operating on the computing device 400.

The execution of the service instructions by the processor 412 generates data, which are stored (by the processor 412) in the volatile memory 422 (as illustrated in FIG. 3C). This step is not represented in FIG. 4A for simplification purposes.

The method 500 comprises the step 525 of adding (at least some of the) data generated by the execution of the service instructions (at sub-step 520-3) to the operational instance of the service for permanent storage in the non-volatile memory 424 (as illustrated in FIG. 3D). Step 525 is executed by the processor 412. For example, the generated data are copied from the volatile memory 422 to a file (in the non-volatile memory 424) associated to the operational instance of the service.

The method 500 comprises the optional step 530 executed by the processor 412. Optional step 530 consists, upon occurrence of an interruption of the executable instance of the service, in launching a new executable instance of the service associated to the operational instance of the service. The new executable instance of the service uses the generated data previously added to the operational instance of the service at step 525.

The launch (at step 530) of the new executable instance of the service is similar to the previously described launch (at step 520) of the original executable instance of the service. In addition, the processor 412 copies the generated data previously added (at step 525) to the operational instance of the service (and permanently stored in the non-volatile memory 424) into the volatile memory 422. The generated data copied in the volatile memory 422 are used during the new execution of the service instructions by the processor 412.

As mentioned previously, the service optionally comprises service data stored in the non-volatile memory 424. In this case, the launching of the executable instance of the service (at step 520) further comprises the optional sub-step 520-2 of copying the service data from the non-volatile memory 424 to the volatile memory 422. The execution of the service instructions at sub-step 520-3 uses the service data copied into the volatile memory 422 (as illustrated in FIG. 3E).

The execution of the service instructions by the processor 412 (at sub-step 520-3) may generate modifications to the service data copied in the volatile memory 422. In this case, the method 500 comprises the optional step 526 of adding (at least some of) the modifications to the service data to the operational instance of the service for permanent storage in the non-volatile memory 424 (as illustrated in FIG. 3F). Step 526 is executed by the processor 412. For example, the modifications to the service data are copied from the volatile memory 422 to the file (in the non-volatile memory 424) associated to the operational instance of the service.

Furthermore, in optional step 530, the new executable instance of the service also uses the modifications to the service data previously added to the operational instance of the service. For this purpose, the processor 412 copies the modifications to the service data previously added to the operational instance of the service (and permanently stored in the non-volatile memory 424) into the volatile memory 422. The modifications to the service data copied in the volatile memory 422 are used during the new execution of the service instructions by the processor 412.

As mentioned previously, the execution of the service instructions by the processor 412 (at sub-step 520-3) may generate modifications to the service instructions copied in the volatile memory 422. In this case, the method 500 comprises the optional step 527 of adding (at least some of) the modifications to the service instructions to the operational instance of the service for permanent storage in the non-volatile memory 424 (as illustrated in FIG. 3G). Step 527 is executed by the processor 412. For example, the modifications to the service instructions are copied from the volatile memory 422 to the file (in the non-volatile memory 424) associated to the operational instance of the service.

Furthermore, in optional step 530, the new executable instance of the service also uses the modifications to the service instructions previously added to the operational instance of the service. For this purpose, the processor 412 copies the modifications to the service instructions previously added to the operational instance of the service (and permanently stored in the non-volatile memory 424) into the volatile memory 422. The modifications to the service instructions copied in the volatile memory 422 are used during the new execution of the service instructions by the processor 412.

The method 500 also comprise the optional step 535 of, upon detection of a particular event, removing (by the processor 412) from the non-volatile memory 424 the operational instance of the service. For example, the event is a detection of an issue with the executable instance of the service. The processor 412 removes the operational instance of the service associated to the executable instance of the service from the non-volatile memory 424 (and stops the execution of the executable instance of the service). In another example, the event is a factory reset of the computing device 400. The processor 412 removes all the operational instances of all the services from the non-volatile memory 424.

Steps 530 and 535 are implemented concurrently by the method 500. Alternatively, only one of steps 530 or 535 is implemented by the method 500.

As mentioned previously in relation to FIG. 3H, several operational instances of the same service may be generated (and several corresponding executable instances launched). Thus steps, 510-515-520-525-526-527-530-535 may be repeated for the same service stored at step 505.

As mentioned previously in relation to FIG. 3I, several services may be supported by the OS of the computing device 400. Thus steps, 505-510-515-520-525-526-527-530-535 may be performed for each service supported by the OS of the computing device 400.

The method 500 may comprise the optional step (not represented in FIGS. 4A-B for simplification purposes) of receiving a new version of the service via the communication interface 430 from a remote computing device (not represented in FIG. 1). The processor 412 stores the new version of the service in the non-volatile memory 424. For each new execution of step 510, the reference to the service is associated to the new version of the service for each newly generated operational instance of the service.

Alternatively, the original and the new versions of the service are simultaneously maintained in the non-volatile memory 424. For each new execution of step 510, the reference to the service is associated to one of the original or the new version of the service for each newly generated operational instance of the service. More generally, a plurality of versions of the service may be simultaneously maintained in the non-volatile memory 424, with a plurality of operational instances of the service being respectively associated with anyone among the plurality of versions of the service (via respective references to a selected one among the plurality of versions of the service), and with a plurality of executable instances of the service associated to the plurality of operational instances of the service.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method providing resilient execution of a service on a computing device, the method comprising:
   storing the service in a non-volatile memory of the computing device, the service comprising instructions executable by a processor of the computing device;
   generating by the processor an operational service data structure associated to the service, the operational service data structure comprising a reference to the service;
   storing by the processor the operational service data structure in the non-volatile memory with a read-write access right;
   launching by the processor an instance of the service associated to the operational service data structure, the launching comprising copying the instructions of the service from the non-volatile memory to a volatile memory of the computing device and executing the instance of the service by executing the instructions of the service copied into the volatile memory;
   storing by the processor data generated by the execution of the instance of the service in the volatile memory;
   copying by the processor critical data to the operational service data structure associated to the executed instance of the service for permanent storage in the non-volatile memory, the critical data consisting of only some of the data generated by the execution of the instance of the service and stored in the volatile memory; and
   upon occurrence of an interruption of the executed instance of the service, launching by the processor a new instance of the service associated to the operational service data structure, the new instance of the service using the critical data copied into the operational service data structure;
   wherein the critical data copied into the operational service data structure are critical for starting the new instance of the service from a state identical to a state of the executed instance of the service before the occurrence of the interruption.

2. The method of claim 1, wherein the service has a read-only access right.

3. The method of claim 1, wherein a file stores the instructions of the service, and the operational service data structure is a file storing the reference to the service and the generated data copied from the volatile memory.

4. The method of claim 3, wherein the reference to the service comprises a pointer to the file storing the instructions of the service.

5. The method of claim 1, further comprising copying by the processor the critical data of the operational service data structure from the non-volatile memory to the volatile memory for usage by the new instance of the service.

6. The method of claim 1, further comprising upon detection of an event, removing by the processor from the non-volatile memory the operational service data structure, the event comprising a factory reset of the computing device or a detection of an issue with the executed instance of the service.

7. The method of claim 1, wherein the service further comprises service data, the launching comprises copying by the processor the service data from the non-volatile memory to the volatile memory, and the execution of the instance of the service by the processor uses the service data copied into the volatile memory.

8. The method of claim 7, wherein the execution of the instance of the service by the processor generates modifications to the service data copied into the volatile memory and at least some of the modifications to the service data are copied by the processor to the operational service data structure associated to the executed instance of the service for permanent storage in the non-volatile memory.

9. The method of claim 8, further comprising upon occurrence of the interruption of the executed instance of the service and the launching by the processor of the new instance of the service associated to the operational service data structure, using by the new instance of the service the modifications to the service data previously copied to the operational service data structure.

10. The method of claim 9, further comprising copying by the processor the modifications to the service data previously copied to the operational service data structure from the non-volatile memory to the volatile memory for usage by the new instance of the service.

11. The method of claim 8, further comprising upon detection of an event, removing by the processor from the non-volatile memory the operational service data structure, the event comprising a factory reset of the computing device or a detection of an issue with the executed instance of the service.

12. The method of claim 1, wherein the execution of the instance of the service by the processor generates modifications to the instructions of the service copied into the volatile memory and at least some of the modifications to the instructions of the service are copied by the processor to the operational service data structure associated to the executed instance of the service for permanent storage in the non-volatile memory.

13. The method of claim 12, further comprising upon occurrence of the interruption of the executed instance of the service and the launching by the processor of the new instance of the service associated to the operational service data structure, using by the new instance of the service the modifications to the instructions of the service previously copied to the operational service data structure.

14. The method of claim 13, further comprising coping by the processor the modifications to the instructions of the service previously copied to the operational service data structure from the non-volatile memory to the volatile memory for usage by the new instance of the service.

15. The method of claim 12, further comprising upon detection of an event, removing by the processor from the non-volatile memory the operational service data structure, the event comprising a factory reset of the computing device or a detection of an issue with the executed instance of the service.

16. The method of claim 1, further comprising:
generating by the processor a second operational service data structure, the second operational service data structure comprising a reference to the service;
storing by the processor the second operational service data structure in the non-volatile memory with a read-write access right;
launching by the processor a second instance of the service associated to the second operational service data structure, the launching comprising copying the instructions of the service from the non-volatile memory to the volatile memory and executing the second instance of the service by executing the instructions of the service copied into the volatile memory;
storing by the processor data generated by the execution of the second instance of the service in the volatile memory; and
copying by the processor critical data to the second operational service data structure for permanent storage in the non-volatile memory, the critical data consisting of only some of the data generated by the execution of the second instance of the service and stored in the volatile memory.

17. The method of claim 1, further comprising:
storing in the non-volatile memory a plurality of services, each service comprising instructions executable by the processor, each service having a read-only access right;
generating by the processor an operational service data structure for each service, each operational service data structure comprising a reference to the corresponding service;
storing by the processor each operational service data structure in the non-volatile memory with a read-write access right;
launching by the processor an instance of service for each operational service data structure, each instance of service being associated to the corresponding operational service data structure, each launching comprising copying the instructions of the corresponding service from the non-volatile memory to the volatile memory and executing the instance of the corresponding service by executing the instructions of the corresponding service copied into the volatile memory;
storing by the processor data generated by the execution of the instance of each service in the volatile memory; and
copying by the processor only some of the data generated by the execution of the instance of each service and stored in the volatile memory to the corresponding operational service data structure for permanent storage in the non-volatile memory.

18. The method of claim 1, further comprising receiving the service by the processor via a communication interface of the computing device from a remote computing device and storing by the processor the received service in the non-volatile memory.

19. The method of claim 1, further comprising storing a new version of the service in the non-volatile memory and associating the reference to the service to the new version of the service for each newly generated operational service data structure.

20. The method of claim 1, further comprising storing a new version of the service in the non-volatile memory and associating the reference to the service to one of a previous version of the service stored in the non-volatile memory or the new version of the service for each newly generated operational service data structure.

21. A non-transitory computer program product comprising instructions executable by a processor of a computing device, the execution of the instructions by the processor of the computing device providing resilient execution of a service on the computing device by:

storing by the processor the service in a non-volatile memory of the computing device, the service comprising instructions executable by the processor;

generating by the processor an operational service data structure associated to the service, the operational service data structure comprising a reference to the service;

storing by the processor the operational service data structure in the non-volatile memory with a read-write access right;

launching by the processor an instance of the service associated to the operational service data structure, the launching comprising copying the instructions of the service from the non-volatile memory to a volatile memory of the computing device and executing the instance of the service by executing the instructions of the service copied into the volatile memory;

storing by the processor data generated by the execution of the instance of the service in the volatile memory;

copying by the processor critical data to the operational service data structure associated to the executed instance of the service for permanent storage in the non-volatile memory, the critical data consisting of only some of the data generated by the execution of the instance of the service and stored in the volatile memory; and upon occurrence of an interruption of the executed instance of the service, launching by the processor a new instance of the service associated to the operational service data structure, the new instance of the service using the critical data copied into the operational service data structure;

wherein the critical data copied into the operational service data structure are critical for starting the new instance of the service from a state substantially identical to a state of the executed instance of the service before the occurrence of the interruption.

\* \* \* \* \*